United States Patent [19]

Wozny

[11] 4,396,740

[45] Aug. 2, 1983

[54] SCAVENGING OF RESIDUAL ACRYLONITRILE MONOMER IN ABS LATEX

[75] Inventor: Mary E. Wozny, Coolville, Ohio

[73] Assignee: Borg-Warner Chemicals, Inc., Parkersburg, W. Va.

[21] Appl. No.: 374,117

[22] Filed: May 3, 1982

[51] Int. Cl.³ .............................................. C08L 9/04
[52] U.S. Cl. .................................. 524/827; 528/492; 524/566
[58] Field of Search ...................... 524/827, 565, 566; 528/492

[56] References Cited

U.S. PATENT DOCUMENTS

| | | | |
|---|---|---|---|
| 4,193,903 | 3/1980 | Giddings et al. | 524/827 |
| 4,196,111 | 4/1980 | Gomez | 528/492 |
| 4,197,400 | 4/1980 | Wollrab et al. | 524/827 |
| 4,251,412 | 2/1981 | Ferrini | 260/29.6 PT |
| 4,272,425 | 6/1981 | Miller et al. | 524/566 |
| 4,278,582 | 7/1981 | Miller | 260/29.6 AN |

*Primary Examiner*—Joseph L. Schofer
*Assistant Examiner*—N. Sarafim
*Attorney, Agent, or Firm*—Richard J. Schlott

[57] ABSTRACT

The addition of aryl methanamines such as m-xylylenediamine to polymer latices which contain residual acrylonitrile monomer is markedly effective in reducing the measurable free acrylonitrile contents of latices.

7 Claims, No Drawings

SCAVENGING OF RESIDUAL ACRYLONITRILE MONOMER IN ABS LATEX

BACKGROUND OF THE INVENTION

This invention relates to a process for reducing the residual acrylonitrile monomer dissolved in acrylonitrile copolymers and in the aqueous media in which acrylonitrile copolymers are polymerized or processed.

Acrylonitrile is employed in the preparation of a wide variety of commercially important resins including for example nitrile rubbers, styrene-acrylonitrile copolymer resins, ABS graft copolymer thermoplastic molding resins and in numerous acrylonitrile-containing graft copolymer impact modifier resins. These copolymers are most often prepared by polymerization in aqueous systems using any of a variety of conventional emulsion and suspension polymerization processes. Even where the polymerization is substantially complete there remains an undesirable amount of unpolymerized acrylonitrile monomer both in the aqueous phase and in the polymer which is removed incompletely and with great difficulty and expense by physical processes such as stripping by steam or vacuum. The presence of residual acrylonitrile in the copolymer is detrimental to the color stability of the resin and may restrict its use due to toxicological considerations and concomitant restrictions imposed by regulation. Similarly, because of environmental considerations the presence of acrylonitrile in the aqueous phase must be minimized where the monomer-containing water will become a part of the plant effluent.

A variety of methods for scavenging residual monomers from the polymer and the aqueous component in combination have been developed in recent years. For example, in U.S. Pat. No. 4,278,582 there is disclosed a process for reducing residual acrylonitrile to levels below 100 ppm by treating the mixtures with ammonium or thio compounds or with a variety of inorganic salts. In U.S. Pat. No. 4,251,412 there is disclosed a method for treating acrylonitrile latices with at least a stoichiometric amount of an alkyl or alkanol amine to reduce the residual monomer content. Although these processes are effective, rather large amounts of the scavenger compound on the order of a stoichiometric (molar) equivalent based on the amount of residual monomer are required. This in turn increases the level of non-aqueous volatiles present in the aqueous phase and may well present further environmental problems.

A process for scavenging the residual acrylonitrile monomer from acrylonitrile copolymers and particularly from both the copolymer and the aqueous phase in a latex which would minimize the amount of scavenger compounds added would thus be a useful advance in the art.

SUMMARY OF THE INVENTION

This invention is a process for scavenging residual acrylonitrile monomer from aqueous media and from acrylonitrile copolymers in contact with aqueous media as, for example, in latices and in aqueous copolymer suspensions comprising adding to the medium an arylmethanamine and more particularly an arylmethanamine selected from the group consisting of benzylamines, xylylenediamines and mesitylylenetriamines as well as mixtures thereof.

DETAILED DESCRIPTION OF THE INVENTION

The aqueous suspensions or dispersions of acrylonitrile polymers useful in the present invention are obtained by polymerizing acrylonitrile alone, or more normally with other vinylidene comonomers to form copolymers, for example with about 50 weight percent or more of butadiene as in nitrile rubbers; up to about 50 weight percent acrylonitrile with about 50–95 weight percent styrene as in SAN resins; about 50–5 weight percent acrylonitrile with about 1–99 weight percent each of an alkyl acrylate such as methyl acrylate, ethyl acrylate, butyl acrylate, methyl methacrylate and the like, styrene and butadiene as in the well-known ABS type graft copolymer resins and other copolymers.

Typically, the polymerizable comonomers in addition to butadiene, styrene and an alkyl acrylate or alkacrylate wherein the alkyl group contains 1 to 8 carbon atoms will be vinylidene monomers having at least one terminal $CH_2=C$ group. Polymerizable comonomers useful in the present invention include: other vinyl aromatics such as alpha-methylstyrene and chloro-styrene; alpha-olefins such as ethylene, propylene and isobutylene; vinyl halides such as vinyl chloride, vinyl bromide, vinyl fluoride, vinylidene chloride, and vinylidene fluoride; vinyl esters such as vinyl acetate; other alpha, beta-olefinically unsaturated nitriles as methacrylonitrile; alkyl vinyl ethers such as methyl vinyl ether, isopropyl vinyl ethers; n-butyl vinyl ether, isopropyl vinyl ether, and haloalkyl vinyl ethers as 2-chloroethyl vinyl ether; n-octyl methacrylate, dodecyl methacrylate, methyl ethacrylate, ethyl ethacrylate, haloalkyl acrylates as chloropropyl acrylate, aminoacrylates and methacrylates and the like; vinyl ketones, vinyl pyridine, alpha,beta-olefinically unsaturated amides such as acrylamide, N-methyl acrylamide, N-t-butyl acrylamide, N-cyclohexyl acrylamide, diacetone acrylamide; methacrylamide, and N-ethyl methacrylamide; alpha,-betaolefinically unsaturated N-alkylol amides such as N-methylol acrylamide, N-ethylol acrylamide, N-propylol acrylamide, N-methylol methacrylamide, and N-ethylol methacrylamide; polyfunctional compounds such as methylene-bis-acrylamide, ethylene glycol dimethacrylate, diethylene glycol diacrylate, allyl pentaerythritol and divinyl benzene; alpha,beta-olefinically unsaturated carboxylic acid monomers containing from 3 to 10 carbon atoms such as acrylic acid, methacrylic acid, crotonic acid, beta-acryloxypropionic acid, hydrosorbic acid, sorbic acid, alpha-chlorosorbic acid, cinamic acid, beta-styrylacrylic acid, itaconic acid, citraconic acid, maleic acid, fumaric acid, mesaconic acid, glutaconic acid, aconitric acid and the like. The preferred acid monomers are the alpha,beta-monoolefinically unsaturated monocarboxylic acids such as acrylic acid and methacrylic acid, and the like, as are known to those skilled in the art. Mixtures of one or more of the above-mentioned monomers may be employed if desired. Generally, up to about 20% by weight of other polymerizable vinylidene comonomers may be employed.

The polymer latices may be prepared using any of the conventional polymerization techniques. The emulsifier may be charged at the outset of the polymerization or may be added incrementally or by proportioning throughout the run. Any of the general types of anionic, cationic or nonionic emulsifiers may be employed, however, best results are generally obtained when anionic emulsifiers are used. Typical anionic emulsifiers which may be used include those types known to those skilled in the art, for example, as disclosed beginning on page 102 in J. Van Alphen's "Rubber Chemicals", Elsevier, 1956, for example, the alkali metal or ammonium salts of the sulfates of alcohols containing from 8 to 18 carbon atoms such as, for example, sodium lauryl sulfate; alkali metal and ammonium salts of sulfonated petroleum or paraffin oils; sodium salts of aromatic sulfonic acids such as dodecane-1-sulfonic acid and octadiene-1-sulfonic acid; alkyl aryl sulfonates such as sodium isopropyl benzene sulfonate and sodium dodecyl benzene sulfonate; alkali metal and ammonium salts of sulfonated dicarboxylic acid esters such as sodium dioctyl sulfosuccinate and disodium N-octadecyl sulfosuccinamate; alkali metal or ammonium salts of the free acids of complex organic mono- and diphosphate esters; and the like. So called nonionic emulsifiers are octyl- or nonylphenyl polyethoxyethanol and the like. Useful as emulsifiers are the alkali metal salts of the aromatic sulfonic acids and the sodium salts of the aromatic sulfonic acids and the sodium salts of the alkyl aryl sulfonates. In addition to the above-mentioned emulsifiers it may be desirable and advantageous to add post-polymerization emulsifiers and stabilizers to the polymeric anionic latex binders in order to improve the latex stability if it is to be stored for prolonged periods prior to use. Such post-polymerization emulsifiers may be the same as, or different than, the emulsifier employed in conducting the polymerization but preferably are anionic or nonionic surface active agents.

To initiate the polymerization free radical catalysts are employed. The use of such catalysts, although in certain systems not absolutely essential, ensures a more uniform and controllable polymerization and a satisfactory polymerization rate. Commonly used free radical initiators include the various peroxygen compounds such as the persulfates, benzoyl peroxide, t-butyl hydroperoxide, cumene hydroperoxide; azo compounds such as azodiisobutyronitrile, and dimethyl azodiisobutyrate; and the like. Especially useful as polymerization initiators are the water-soluble peroxygen compounds such as hydrogen peroxide and the sodium, potassium and ammonium persulfates.

The alkali metal and ammonium persulfate catalysts may be employed by themselves or in activated redox systems. Typical redox systems include the persulfates in combination with: a reducing substance such as a polyhydroxy phenol and an oxidizable sulfur compound such as sodium sulfite or sodium bisulfite, a reducing sugar, a diazomercapto compound, a ferricyanide compound, dimethylaminopropionitrile and the like. Heavy metal ions such as silver, cupric, iron, cobalt, nickel and others may also be used to activate persulfate catalyzed polymerizations. In general the amount of free radical initiator employed will range between about 0.1 to 5% based on the weight of the total monomers. The initiator is generally completely charged at the start of the polymerization, however, incremental addition or proportioning of the initiator throughout the polymerization is often desirable.

In conducting the polymerization for the preparation of the latices of the present invention the monomers are typically charged into the polymerization reactor which contains the water and the emulsifying agent. The reactor and its contents are then heated and the polymerization initiator added. The temperature at which the polymerization is conducted is not critical and may range from about 0° C. and 80° C. or higher. Excellent results, however, have been obtained when the polymerization temperature is maintained between 5° C. and 70° C. Polymerization modifiers such as the primary, secondary, and tertiary mercaptans, buffers, electrolytes and the like may also be included in the polymerization.

The amines useful in the practice of this invention are aryl methanamines having the formula $Ar-(CH_2-NH_2)_x$ wherein $Ar-$ is an aryl radical such as for example a phenyl radical or naphthyl radical, and wherein x is an integer from 1 to 3. Included are compounds selected from the group consisting of benzylamine wherein $Ar=$phenyl and $x=1$, xylylenediamine wherein $Ar=$phenyl and $x=2$ and mesitylylenetriamine wherein $Ar=$phenyl and $x=3$, as well as mixtures thereof.

The amount of amine employed will depend in part upon the level or residual acrylonitrile monomer present in the system. In general the amount of amine used will be less than the stoichiometric (molar) equivalent of the amount of residual acrylonitrile monomer. The amines may be added to the acrylonitrile containing aqueous dispersions directly or in the form of a water solution. An advantage of the process of this invention is that by means of this technique free acrylonitrile dissolved in the polymer particles may also be converted and not be present in undesirable amounts. This technique for decreasing the acrylonitrile content of water systems containing free acrylonitrile may be used widely in the case of acrylonitrile latices. Normally a preferred procedure would be to steam and/or vacuum strip the latex to remove as much acrylonitrile as possible then use the amine to remove the remainder of the acrylonitrile which is difficult or impossible to remove completely by stripping methods.

The process of the invention is equally and even more valuably applied to effluent streams from plants using acrylonitrile wherein there is dissolved in the effluent water trace, or even larger amounts, of undesirable acrylonitrile. By treating such water effluents in accordance with this invention, the undesirable acrylonitrile is converted so as not to be a problem in plant effluence. A further application would be the use of amines as gas scrubbers where gaseous effluents from reactors and the like may contain undesirable acrylonitrile that might be vented to the atmosphere.

Thus the process of the invention will find use in plants where acrylonitrile is manufactured and there may be effluent streams containing undesirable acrylonitrile, in fiber plants where acrylonitrile is a major constituent of the polymers used to make fibers, wherein there may be acrylonitrile containing effluents, ABS plants wherein acrylonitrile is an integral part of ABS polymer and where there may be both latices and effluents containing undesirable acrylonitrile and plants manufacturing both latices or copolymers of butadiene and acrylonitrile and the resulting dry polymers, whereby there may be undesirable plant effluents containing acrylonitrile in addition to the copolymer latex that may thus be treated to reduce the undesirable acrylonitrile content thereof.

The practice of the process of this invention will be better understood by consideration of the following Examples.

EXAMPLES 1-4

In the following Examples, 100 ml portions of an ABS latex were stirred at 48° C. with and without the addition of m-xylylenediamine (MXDA) in the amounts shown. At the end of the 24 hr. reaction period, 0.5 ml aliquots were withdrawn, cooled, diluted with an inert solvent, dimethyl acetamide, and injected into a gas-liquid chromatography for determination of residual acrylonitrile monomer. The amounts of MXDA employed and the resulting acrylonitrile contents of the latices are summarized in Table I.

TABLE I

| Ex No | MXDA[1] m/100 ml | mole[1] ratio | Residual AN, ppm (24 hr.)[1] No Amine | Amine | Reduction % |
|---|---|---|---|---|---|
| 1 | 0.0123 | 0.65 | 10015 | 0 | 100 |
| 2 | 0.0116 | 0.68 | 8143 | 0.8 | 100 |
| 3 | 0.0077 | 0.45 | 8143 | 1.6 | 100 |
| 4 | 0.0035 | 0.23 | 8143 | 1266 | 81 |
| 5 | 0.0035 | 0.23 | 7432 | 2268 | 70 |
| 6 | 0.0022 | 0.16 | 6552 | 3420 | 48 |

Notes:
[1]MXDA = m-xylylene diamine, moles/100 ml latex;
mole ratio = moles MXDA/moles AN initially present.
Residual AN = acrylonitrile content in ppm after 24 hours.

It will be apparent from these data that as little as 0.16 m MXDA per mole of acrylonitrile monomer results in a marked reduction in residual acrylonitrile as compared with the amount of acrylonitrile present after merely heating the latex for 24 hrs. For comparative purposes, separate samples of the latices used in Examples 5 and 6 were treated with diethyl amine at levels of 0.23 m/mole AN and 0.30 m/m AN respectively, which resulted in reductions of only 24% and 30%, respectively, together with a substantial degree of resin coagulation. Simple alkyl amines are thus clearly inferior to aryl methanamines in acrylonitrile scavenging ability, and tend to coagulate the latex even at very low concentration. In the prior art, this coagulation effect could only be overcome by substantial dilution of the alkyl amines with water before mixing with latices, which in turn markedly increases the volume of effluent and reduces the efficiency of the process in terms of increased water consumption.

The benefits of using aryl methanamines for the process of this invention was further demonstrated by carrying out the scavenging process as described in Example 4 but employing 0.22 m of benzylamine/m of residual acrylonitrile, resulting in a 33% reduction in residual acrylonitrile monomer, again without significant latex coagulation.

The process of this invention will thus be seen to be a process for scavenging the residual acrylonitrile monomer from aqueous media comprising adding to the medium an aryl methanamine such as, for example, benzylamine, xylylenediamine or mesitylylenetriamine.

I claim:

1. A process for reducing the residual acrylonitrile monomer in an aqueous medium containing said monomer comprising adding to said medium an aryl methanamine.

2. The process of claim 1 wherein said arylmethanamine is selected from the group consisting of benzylamine, xylylenediamine, mesitylylenetriamine and mixtures thereof.

3. The process of claim 1 wherein the amount of aryl methanamine employed is at least 0.2 m per mole of acrylonitrile present in the medium.

4. The process of claim 1 wherein the medium is an aqueous dispersion of an acrylonitrile polymer.

5. A process for reducing the residual acrylonitrile monomer in an aqueous dispersion of an acrylonitrile polymer comprising adding to said medium at least 0.2 mole of an aryl methanamine per m of residual acrylonitrile monomer.

6. The process of claim 5 wherein the aryl methanamine is selected from the group consisting of benzylamine, xylylenediamine, mesitylylenetriamine and mixtures thereof.

7. The process of claim 5 wherein the aryl methanamine is m-xylylenediamine.

* * * * *